United States Patent [19]

Walling et al.

[11] Patent Number: 4,597,921
[45] Date of Patent: Jul. 1, 1986

[54] PROVISION OF PLASTIC INSULATION UPON AN ELECTRICAL CONDUCTOR

[75] Inventors: Jorg-Hein Walling, Beaconsfield; Peter M. Murphy, Nepean, both of Canada

[73] Assignee: Northern Telecom Limited, Montreal, Canada

[21] Appl. No.: 634,556

[22] Filed: Jul. 26, 1984

[51] Int. Cl.⁴ .................. B29C 63/18; B29C 65/08
[52] U.S. Cl. ................... 264/23; 156/73.1; 156/244.12; 156/244.17; 264/1.4; 264/40.7; 264/167; 264/173; 264/174; 425/174.2
[58] Field of Search ............. 264/23, 167, 173, 174, 264/172, 25, 26, 506; 156/244.17, 244.13, 244.14, 244.15, 244.12, 273.9, 73.1, 73.2, 52; 425/174.2, 1.4, 173, 40.7

[56] References Cited

U.S. PATENT DOCUMENTS

| | | | |
|---|---|---|---|
| 2,484,014 | 10/1949 | Peterson et al. | 264/23 |
| 2,549,179 | 4/1951 | Deboutteville | 264/23 |
| 2,568,303 | 9/1951 | Rosenthal | 264/23 |
| 2,800,682 | 7/1957 | Dooley | 425/174.2 |
| 3,022,802 | 2/1962 | Lewis | 156/73.1 |
| 3,046,178 | 7/1962 | Tupper | 156/244.14 |
| 3,274,037 | 9/1966 | Nixon | 156/73.1 |
| 3,435,105 | 3/1969 | Ferrari | 264/173 |
| 3,672,012 | 6/1972 | Burklund | 264/25 |
| 3,773,872 | 11/1973 | Isshiki et al. | 264/23 |

FOREIGN PATENT DOCUMENTS

| | | | |
|---|---|---|---|
| 47-21601 | 6/1972 | Japan | 264/167 |
| 51-35238 | 10/1976 | Japan | 425/174.2 |
| 51-46547 | 12/1976 | Japan | 425/174.2 |

*Primary Examiner*—Jeffery Thurlow
*Attorney, Agent, or Firm*—R. J. Austin

[57] ABSTRACT

Providing plastic insulation on an electrical conductor in which the conductor, enclosed in an oversize tube, is passed through a fluid and through an annular crystal of a piezoelectric material immersed in the fluid. During passage of tube and conductor, the crystal is subjected to electric current to cause alternating expansion and contraction of the crystal. Pressure shockwaves are produced by this expansion and contraction and the shockwaves are focussed upon the pass line of the tube and conductor to cause localized inward deformations of the tube into engagement with the conductor to form spaced annular depressions in the tube. In preferred arrangements, apparatus has an extruder immediately upstream of the crystal so that the plastic tube is in a heated and softened condition during its deformation. A focussing means is required in the apparatus for focussing shockwaves on the pass line. In a practical arrangement, the focussing is provided by an annulus of wave transmitting material which has a concave inner surface facing the pass line.

7 Claims, 3 Drawing Figures

PROVISION OF PLASTIC INSULATION UPON AN ELECTRICAL CONDUCTOR

This invention relates to the provision of plastic insulation upon electrical conductors.

In the manufacture of insulated electrical conductors for use in the telecommunications industry, the insulation is provided to withstand any voltages which may occur upon the conductor and also to satisfy certain parameters of the conductors such as mutual capacitance between conductors of a pair and mutual inductance. Ideally, to result in a mutual capacitance which is at commercially acceptable levels, the conductor should be directly surrounded by a layer of air which has a permittivity of 1.0. However, in most insulated constructions, layers of polymeric material lie next to the conductor and as these have a lower permittivity than air, then the outside diameter of the insulation needs to be greater to achieve the required mutual capacitance. In some insulated conductors, however, a layer of air next to the conductor has been achieved. Such an insulated conductor forms part of a coaxial cable construction in which the conductor concerned is enshrouded by a plastic tube which is spaced slightly from the conductor surface to provide an annular air space between tube and conductor. In these structures, the plastic tube may be held in its spaced position from the conductor by insulating spaces lying between the conductor and the tube or by annular indentations in the tube which extend inwardly at spaced positions so as to contact the conductor. Such indentations are normally formed by a mechanical process in which, for each indentation, the tube is forced inwardly at one axial position by mechanical pressure. The formation of these indentations in series along the plastic tube is a slow process and is the primary reason why the speed of manufacture of the insulated conductor cannot be increased.

The present invention provides a method and apparatus for insulating a conductor with a plastic tube in which the speed of operation may be increased substantially beyond that achievable with the above process.

Accordingly, the present invention provides a method of providing a plastic insulation upon an electrical conductor comprising:

enclosing the conductor within a radially oversize tube of the plastic;

with the plastic in a heated and softened condition, passing the tube and conductor together along a pass line through a fluid and through an annular crystal of a piezoelectric material immersed within the fluid; and during passage of the tube and conductor, subjecting the crystal to an electric current to cause continuously alternating expansion and contraction of the crystal thereby to produce a succession of pressure shockwaves in the fluid radially within the crystal and focussing each shockwave in a localized region which coincides with a position along the pass line to cause a localized radially inward deformation of the tube into engagement with the conductor and thereby forming an annular depression in the tube.

The current applied may be an AC current or intermittent pulses of a DC current. Because of the speed of intermittency of the DC pulses, or the frequency which may easily be achieved using AC current, then the throughput speed of the conductor and plastic tube may be any that is desirable for keeping pace with any throughput speeds of further process steps in the manufacture of the finished conductor. In fact, to achieve a required distance apart of succeeding deformations by the use of the inventive process, then the throughput speed of the conductor may be used to provide signals which are used to control the frequency of the current dependent upon the signals.

By the use of the method of the invention, the succession of pressure shockwaves are focused in succession in the localized region and after formation of each annular depression in the tube, the tube and conductor move along the feedpath a distance sufficient to enable the next succeeding depression to be spaced axially along the tube from it. The focussing of each shockwave in the localized region does, of course, amplify the effect of the shockwave so that a substantial force is applied to the tube during the forming of each depression. It is thus possible to achieve the result required upon the softened tube with a small quantity of electrical power such as, for instance, 0.5 Kw.

The invention also includes an apparatus for providing a plastic insulation upon an electrical conductor comprising a container for holding a fluid and means to form annular depressions in the tube, said means comprising:

an annular crystal of a piezoelectric material disposed within the container to be totally immersed when the fluid is held in the container and to surround a pass line for the conductor enclosed by a radially oversize tube of the plastic;

means to pass an electric current through the crystal to cause continuously alternating expansion and contraction of the crystal thereby to produce a succession of pressure shockwaves in the fluid and radially within the crystal;

means to insulate electrically the crystal and said current passing means from fluid in the container;

means to focus each pressure shockwave in a localized region which coincides with the pass line so as to cause a localized radially inward deformation of the tube into engagement with the conductor while forming an annular depression in the tube; and the apparatus also comprising means to heat the plastic to cause it to be in a heat softened condition when passing through the crystal.

In the method and apparatus according to the invention, the tube may be formed as an extrusion around the conductor with the plastic thus in a molten condition and sufficient heat is retained in the plastic to ensure that it is in a softened condition as it passes through the crystal. Alternatively, the plastic is preformed and is in a cooled condition and needs to be reheated to place it in a softened condition sufficient for it to be deformed when passing through the crystal.

One embodiment of the invention will now be described, by way of example, with reference to the accompanying drawings in which.

Figure 1:
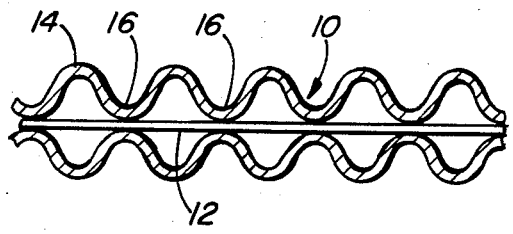
FIG. 1 is a cross-sectional view through an electrical conductor insulated with a plastic tube.

As shown in FIG. 1, an insulated conductor 10 comprises a telecommunications conductor 12 which may be, for instance, of 20, 22, 24 or 26 AWG, and a plastics insulation 14 which is of tubular construction and is formed with a plurality of axially spaced annular depressions 16 which project inwardly from the outer extremities of the tube to contact the conductor and secure the insulation and conductor together, thereby forming separate annular insulation spaces between conductor and tube. As shown in FIG. 1, the depressions 16 are of a shape such that they merge into the outer regions of the tube to provide a substantially continuous curve shape in cross-section, e.g. similar to a sine curve. The tube thickness and the distance of the remote regions of the tube from the conductor are design considerations dependent upon the electrical parameters required. In this particular instance, the tube has a thickness of approximately 3 millimeters and the distance between the radially outer regions of the tube and the conductor is approximately 1.5 millimeters.

Figure 3:
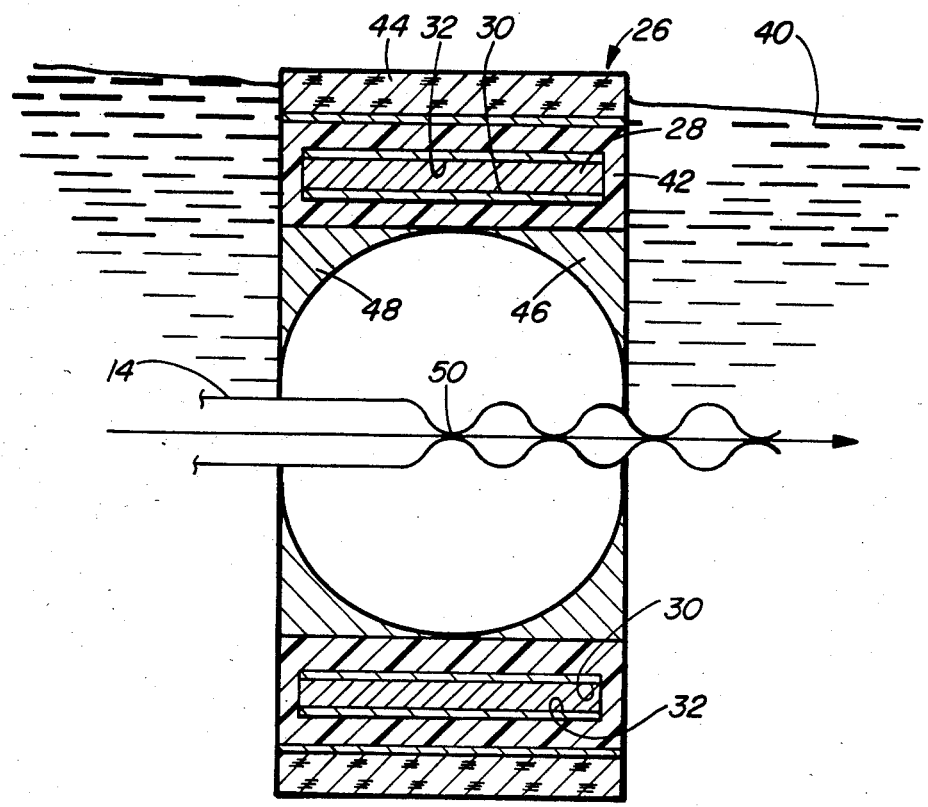
FIG. 3 is a much enlarged view, in cross-section, of part of the apparatus in FIG. 2 to show details of construction.
Figure 2:
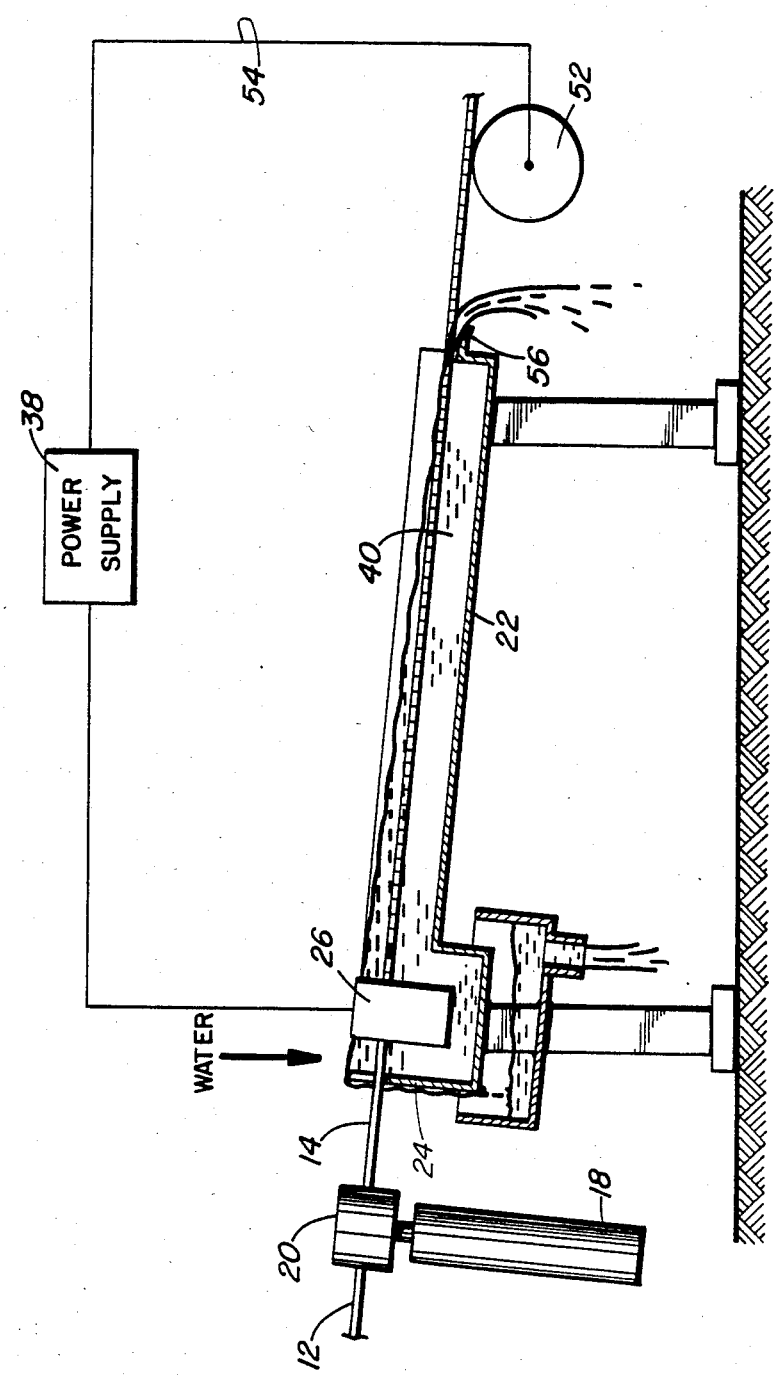
FIG. 2 is a diagrammatic view of apparatus for providing the tube as a plastic insulation upon the conductor.

The insulated conductor is manufactured upon the apparatus shown in FIGS. 2 and 3. As shown by FIG. 2, the apparatus comprises an extruder 18 with extruder head 20. Downstream from the extruder and along a pass line for the conductor 10 is a water trough 22 which is of extended length, as shown, to enable the tube 14 to be cooled during passage of the conductor and insulation along the trough after the tube has been formed with the depressions 16. An upstream end 24 of the water trough is lower at one position than the remainder to enable conductor surrounded by recently extruded tube 14 to be clear from contact with the metal of the trough. Adjacent the upstream end of the trough is disposed a means 26 to form the annular depressions 16 in the tube.

As is shown more clearly in FIG. 3, the means 26 is of annular construction and comprises an annular crystal 28 of a piezoelectric material. This piezoelectric material is to be used because of its characteristics of expansion and contraction when an electrical current is passed through it in typical piezoelectric manner. The aaterial may be, for instance, lead zirconate titanate or single crystal quartz, but in this case the crystal is formed from barium titanate. Means is provided to pass an AC current through the crystal to cause it to continuously expand and contract in alternating fashion. This current passing means comprises two annular electrodes 30 and 32 disposed on the inner and outer surfaces of the crystal 28. These electrodes are formed in this example from copper by metal plating techniques. The electrodes have terminals (not shown) by which they are connected to an AC power supply 38 (see FIG. 2).

The crystal and the electrodes 30 and 32 have means to electrically insulate them from fluid, i.e. cooling water 40, in the trough 22. This insulating means comprises a layer 42 of dielectric polymeric material which closely encapsulates the crystal and the electrodes as shown by FIG. 3.

To concentrate shockwaves generated by the crystal in use and radially within the crystal, the means 26 is provided with a dampening material surrounding the crystal. This material is a layer of cork 44 which is covered with a suitable polymeric film (not shown) to prevent absorption of water into the cork which could change its dampening characteristics.

Because of the piezoelectric nature of the barium titanate, the passage of an AC current through it will cause it to contract and expand alternately, thereby producing pressure shockwaves which will pass through the water 40. In order to enable the shockwaves to concentrate at one point along the pass line of the tube and conductor for the purpose of forming the depressions 16, a means for focussing each shockwave into a localized region within the annulus of the means 26 is provided. This focussing means comprises an annulus 46 of wave transmitting material which is disposed radially within the crystal and to receive shockwaves directly from the crystal and through the insulation 42. The wave transmitting material in this example is Plexiglas (Trademark) but any other material which will transmit the shockwaves through it with substantially no attenuation would be suitable. As shown by FIG. 3, the inner surface 48 of the annulus 46 is of concave configuration which is basically parabolic so as to concentrate all the energy of each shockwave towards the localized region 50 which lies at the center of the arc and coincides with the pass line of the conductor and tube.

It is intended to control the spacing apart of the depressions 16 along the tube and for this purpose it is necessary for the frequency of the AC current to be controlled dependent upon speed of movement of the conductor and tube along the pass line. For this purpose, means is provided for operation by movement of the conductor and tube to produce signals corresponding to the speed of movement. This means 52 is a conventional speed measuring device for articles moving along a pass line and is an incremental encoder which sends the signals along loop 54 to the power supply 38.

In use of the apparatus, it is necessary for the whole of the crystal 28 to be immersed in water. However, as shown by FIG. 2, the crystal extends above the level of the end 24 of the trough. To cover the crystal, therefore, it is necessary to use a flooding means for producing a level of water at the means 26 which is higher than elsewhere and as shown in FIG. 2. For this purpose and to prevent the water flowing over the end 24, it may be necessary to tilt the trough towards its downstream end. This also satisfies the requirement of causing flow of the water from the means 26 along the trough in the direction of movement of the conductor and tube assembly. An outlet 56 is provided at the downstream end of the trough for water. It may also be advisable to provide an outlet (not shown) at the upstream end of the trough so as to enable the height of water at this point to be controlled while ensuring that it does not pass across the end 24.

To provide the insulation for the conductor, the conductor 12 is passed through the extruder head 20 in which it is provided with the surrounding tube 14 by the extruder, the tube at this stage being cylindrical in form, as shown towards the left-hand side of FIG. 3. The tube and conductor then move into the water trough and substantially coaxially through the means 26. As the conductor and tube assembly move through the trough, the means 26 provides signals to the power supply 38 to control the frequency of the AC current sent to the crystal 28 so as to control the distance apart of the depressions as already discussed. As the current passes through the crystal, this cyclically contracts and expands and produces annular pressure shockwaves in the water 40. These shockwaves are dampened in the water lying outside the annulus 26 by the cork 44. However, radially within the crystal 28 the annular pressure shockwaves are transmitted through the wave transmitting material 46 to the concave surface 48. Each annular shockwave then continues into the water towards the localized region 50 while the shockwave decreases in radius and because of the shape of the surface 48, all regions of the wave are caused to converge towards this region 50. The effect of this is to progressively strengthen the power of the wave as it approaches the region 50. Thus when it reaches that region it acts at all locations around a continuous circumferential region of the tube and has the strength to deform the tube inwardly, thereby providing a depression 16. The force required to do this may be rather small and to ensure ease of deformation of the tube, the tube is in a heat softened condition as it passes through the means 26. To provide a heat softened condition at this point, the softening temperature of the particular plastic material should be taken into account, together with the feed speed of the tube and conductor and the temperature of the water 40 in the trough. In this particular example, the tube may be formed from polyethylene or polypropylene with an extrusion temperature of around 400° F. and the water temperature is controlled so that the plastic is still in a softened condition upon reaching the region 50.

As has been shown in practice, an AC current with controlled frequency is entirely suitable for this purpose. For instance, the deformed tube may pass through the trough at a speed of 600 feet per minute or more, which is far greater than is possible with present methods and apparatus for producing similar indentations in an insulating tube. At a speed of 600 feet per minute, the AC current will operate at 480 cycles per second if the annular depressions 16 are to be spaced ¼ inch apart along the tube. This frequency may be easily changed within normal operating ranges if it is required to increase or decrease the throughput speed of the conductor and tube assembly. It is also found that the equipment will operate with 0.5 Kw of power and at 300 volts. The annular means 26 has an overall diameter of approximately 6 inches, with an axial length of approximately 3 inches.

Thus by use of the piezoelectric material to create the shockwaves in the water produced by an acceptable electric current, the speed of manufacture of an insulated conductor in which an insulating tube is provided with depressions, is far greater than is obtainable with conventional equipment.

In a modification of the above embodiment (not shown), the current supplied is a DC current. For the purpose of producing the contractions and expansions in the crystal, it is necessary for the DC current to be an intermittently pulsing current. Hence, in the modification of the embodiment, the measuring means 52 produces signals which, upon transmission to the power source 38, trigger each pulse of the DC current to produce contraction and expansion of the crystal for forming each depression 16.

In the description of the embodiments and as described more generally with regard to the invention, the formation of the depressions in the tube has been described. However, manufacture of each of these depressions is, of course, related to an expansion of the crystal. It is possible that during contraction of the crystal, the pressure shockwave operates in the opposite direction so as to cause slight expansion of the tube between the depressed regions. This, of course, would have the effect of increasing the diameter of the tube between the depressions 16. Thus, in the manufacture of the insulation, the diameter of the extruded tube would need to be controlled with this possible expansion in mind.

What is claimed is:

1. A method of providing a plastic insulation upon an electrical conductor comprising:

enclosing the conductor within a radially oversize tube of the plastic;

with the plastic in a heated and softened condition, passing the tube and conductor together along a pass line through a fluid and through an annular crystal of a piezoelectric material immersed within the fluid; and during passage of the tube and conductor, subjecting the crystal to an electric current to cause continuously alternating explansion and contraction of the crystal thereby to produce a succession of annular pressure shockwaves in the fluid radially within the crystal to form axially spaced-apart localized annular depressions in the hot tube and into contact with the conductor thereby forming separate annular insulating spaces between conductor and tube, each shockwave providing an annular depression by focussing the shockwave in a localized region which coincides with a position along the pass line to cause a localized radially inward annular deformation of the heated and softened tube into engagement with the conductor and thereby forming the annular depression in the tube.

2. A method according to claim 1 comprising extruding the plastic around the conductor to form the tube and retaining the plastic in a heated and softened condition to pass it through the crystal.

3. A method according to claim 1 comprising subjecting the crystal to a continuous AC current to cause the continuously alternating expansion and contraction.

4. A method according to claim 1 comprising subjecting the crystal to intermittent pulses of DC current to cause the continuously alternating expansion and contraction.

5. A method according to claim 3 comprising measuring the throughput speed of the conductor and tube along the pass line and controlling the frequency of the current dependent upon the measured speed to control the distance apart of succeeding deformations.

6. A method according to claim 4 comprising measuring the throughput speed of the conductor and tube along the pass line and controlling the time interval of the intermittent pulses of current dependent upon the measured speed to control the distance apart of succeeding deformations.

7. A method according to claim 1 comprising focussing each shockwave by passing it into a annulus of transmitting material disposed radially within the crystal, and causing the wave to be emitted from a concave inner surface of the transmitting annulus to effect convergence of all regions of the wave towards the localized region.

* * * * *